United States Patent [19]

Knowley

[11] Patent Number: 4,541,646
[45] Date of Patent: Sep. 17, 1985

[54] MUD FLAP HANGER

[76] Inventor: David W. Knowley, 759 Roberta St., Salt Lake City, Utah 84111

[21] Appl. No.: 516,973

[22] Filed: Jul. 25, 1983

[51] Int. Cl.⁴ ............................................. B62D 25/16
[52] U.S. Cl. ............................... 280/154.5 R; 16/274; 248/289.1; 277/215; 403/91; 403/225
[58] Field of Search ................... 280/154.5 R; 403/91, 403/84, 383, 225; 248/289.1; 16/341, 342, 274, 385, 386, DIG. 13, DIG. 27; 277/215; 384/125

[56] References Cited

U.S. PATENT DOCUMENTS

| | | | |
|---|---|---|---|
| 1,166,551 | 1/1916 | Simmons | 16/342 |
| 2,164,047 | 6/1939 | Baumann | 16/274 |
| 2,488,316 | 11/1949 | Mosby | 248/289.1 |
| 2,872,211 | 2/1959 | Barrett | 280/154.5 R |
| 3,000,049 | 9/1961 | Terry, Jr. | 16/386 X |
| 3,015,126 | 1/1962 | Ahlgren | 16/386 |
| 3,640,494 | 2/1972 | Ruter | 248/289.1 X |
| 3,934,901 | 1/1976 | Hammerly | 280/154.5 R |
| 4,033,599 | 7/1977 | Fusco | 280/154.5 R |
| 4,335,862 | 6/1982 | Sherman | 248/289.1 |

Primary Examiner—Joseph F. Peters, Jr.
Assistant Examiner—Michael Mar
Attorney, Agent, or Firm—Richard F. Bojanowski

[57] ABSTRACT

A mud flap hanger for use on road vehicles such as trucks and truck-tractors wherein the hanger is adapted with pivotally mounted arms to which are attached mud flaps. The mud flaps may be moved from behind the wheel of a truck and stowed centrally between the rear wheels. Pivotal movement of the arms is achieved through use of a flexible bushing generally rectangular in shape wherein the inner walls of a generally square aperture has expansion slots and lubrication grooves for lubricating the arms carried within the aperture.

12 Claims, 6 Drawing Figures

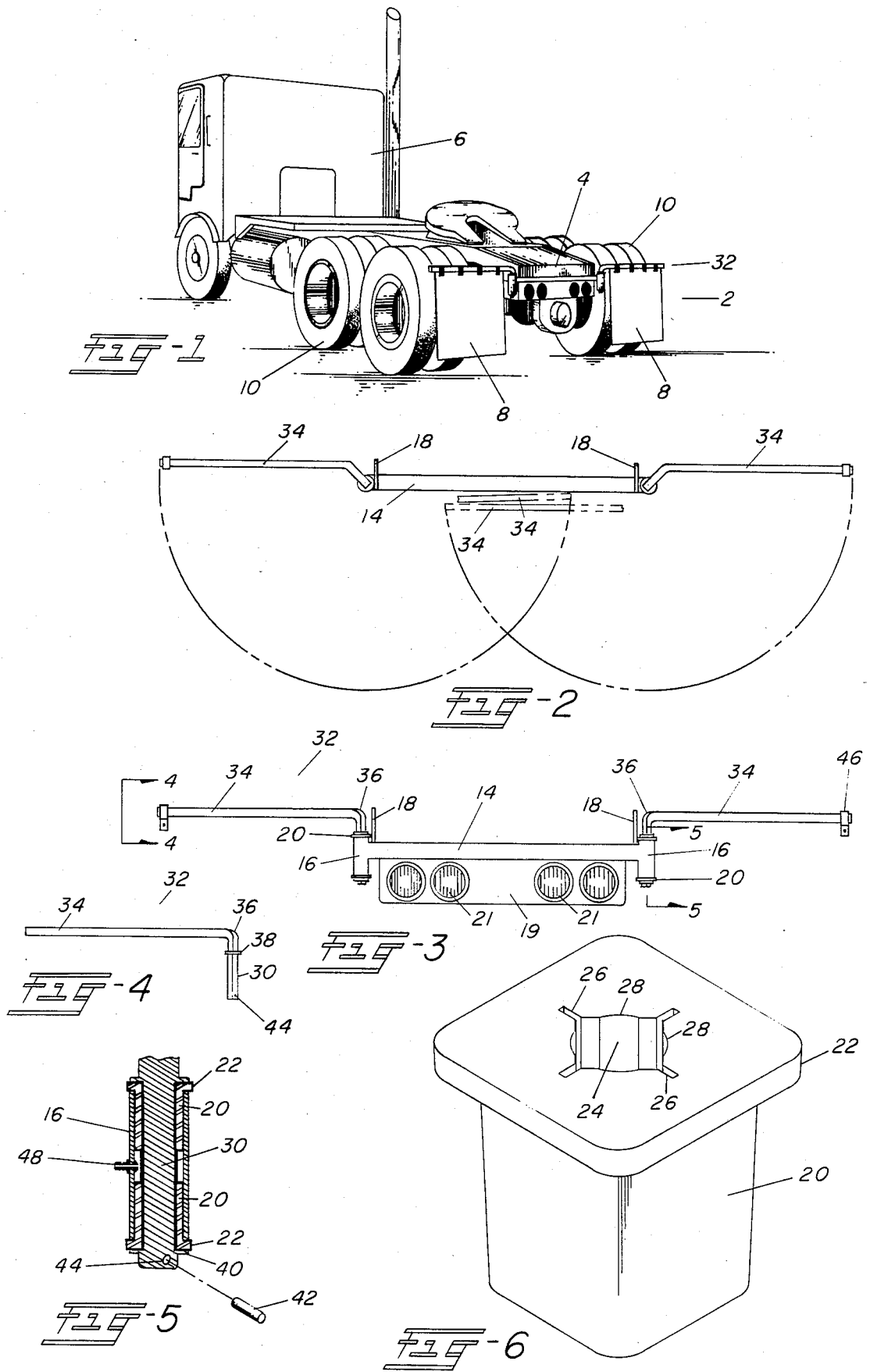

MUD FLAP HANGER

BACKGROUND OF THE INVENTION

1. Field of the Invention

This invention relates to vehicle mud flaps and particularly to mud flap hangers carried within a flexible bushing to permit pivotal movement thereof, and help prevent vibration causing metal fatigue and subsequent breakage.

2. Description of the Prior Art

Mud flaps are currently in use on most all vehicles such as truck tractors or trailers for intercepting mud, gravel, water, etc. The use of mud flaps avoids damage to following vehicles and to pedestrians who may be in close proximity to the passage of trucks or trailers. The mud flaps are generally fixed to the frame of a truck or tractor behind their respective wheels. The mud flaps are generally constructed from a thick, resilient material such as plastic or rubber. Although mud flaps are optional on a tractor when a trailer is attached to the tractor, it is necessary and, in all cases, required by law that a tractor not carrying a trailer be equipped with mud flaps. Since most moving tractors are normally pulling a trailer, mud flaps fixed behind the wheels of the tractor can be seriously damaged. It is, therefore, advantageous to have mud flaps which can be readily removed from behind the tractor wheels when a trailer is being pulled. In most cases, the mud flaps cannot be readily removed because of mud and other road debris which makes the removal of the mud flaps somewhat difficult. To avoid damage to the mud flaps and to facilitate positioning of the mud flaps so that damage will not be caused to them, several types of mud flap assemblies have been proposed such as that shown in U.S. Pat. No. 3,934,901. Other patents showing various other types of mud flap hangers can be found in U.S. Pat. Nos. 2,640,714; 3,746,366 and 4,007,944.

SUMMARY OF THE INVENTION

The pivotally mounted mud flap arms of this invention includes a support member, a housing member fixed to each end of the support member and a pair of flexible bushings carried within each end of said housing member. In addition, a mud flap hanger means is also provided having a short arm, a long arm and a curved neck interconnecting the short arm with the long arm. The short arm of the mud flap hanger is pivotally carried within each pair of bushings contained within the housing member.

The bushings are constructed from a polymeric or rubber type material having a generally square aperture passing therethrough, the inner walls of the aperture contain expansion slots. A generally "L" shaped hanger means results wherein the short arm is generally referred to as the pivotal arm and the long arm is adapted with removable clips to which the down hanging mud flaps are attached.

The flexible bushing is slightly tapered and has elongated sidewalls defining a generally rectangular shape. The same type of bushing is designed to fit into both ends of the open-ended housing member. However, it is generally preferred that one of the set of bushings be of different degrees of rigidity. The inner dimensions of the housing member and the outer dimensions of the bushing are such that a snug fit is achieved by inserting the bushing into the housing member, the ledge overlaps over the housing member's end sections. Each bushing has an elongated, centrally located, square shaped opening passing through the bushing. The sides of the square aperture is slightly less than the outer perimeter of the short arm, which is likewise shaped in the form of a square with its 45° corners ground to a radius of about 0.020 inch. The resulting appearance of the outer surface of the short leg results in a square configuration with only slightly rounded corners.

At each corner of the square bushing's aperture, a slot is cut to facilitate expansion of the bushing's internal side walls during the pivotal movement of the short arm within the bushing and to provide convenient indentation stops as the short arm's corner pieces pass into communication with the bushing's corner sections. Each side wall of the square aperture found in the bushing also contains a slight groove for carrying lubricating materials into an area between the short arm and the outer walls of the bushing. The lubricating materials are introduced through a nipple positioned on one of the housing member's side walls.

As indicated above, the square shaped short leg of the hanging member is slightly larger than the square shaped aperture cut into the bushing. Since the bushing is flexible, the generally "L" shaped hanging member can be pivotally moved within the bushing and locked in each position where the corners of the short leg match or come into communication with the corners of the bushing. This arrangement permits the "L" shaped mud flap carrying member to be pivotally moved so that the flaps are positioned directly behind the wheels of a moving tractor. When mud flaps are not necessary or if there is a trailer attached to the truck, the mud flaps may be pivotally rotated inwardly and stored in a position between the wheels of the tractor.

DESCRIPTION OF THE DRAWINGS

FIG. 1 is a perspective view of a tractor to which the mud flap hangers of this invention are fixed.

FIG. 2 is a top view looking down on the mud flap hanger shown in FIG. 1.

FIG. 3 is a front elevational view of the mud flap hanger shown in FIG. 2.

FIG. 4 is a view of the mud flap hanger member removed from the bushing containing housing shown in the above figures.

FIG. 5 is a cross-section view taken along line 5—5 of FIG. 3.

FIG. 6 is an enlarged perspective view of the flexible bushing member used in the mud flap hanger of this invention.

DESCRIPTION OF THE PREFERRED EMBODIMENT

Referring to FIGS. 1 through 6, inclusive, a mud flap hanger 2 is fixed to a frame 4 of a tractor-truck using rubber vibration isolaters 6 with mud flaps 8 positioned behind the wheels 10 of the tractor 6. With particular reference to FIG. 3, it can be seen that the mud flap hanger includes a support member 14 having an open ended elongated housing member 16 fixed to each end of the support member. The housing member may be constructed from any type of metallic material and may be in any particular shape. However, in the preferred embodiment of this invention, the housing member is constructed from a hollow square steel beam. The elongated housing members are, likewise, preferably constructed from hollow square beams of metal.

A mounting bracket 18 is fixed to the support member 14 for mounting to a frame 4 of the tractor truck 6. Preferably the bracket member shall contain a plurality of apertures (not shown) and fastened to a frame 4 by means of nuts and bolts or other securing means, through rubber vibration isolating mounts.

A panel is attached with screws to the bottom side of the support member for primarily decorative puposes and that the panel 19 may contain apertures for holding electrical lamps connected to the braking system of the tractor, also tail lights and turn signals.

A slightly tapered flexible bushing 20 having a stop ledge 22 at one of its ends is carried within each end opening of the housing member 16. A generally square aperture 24 is centrally bored though the flexible bushing. At each inner corner of the square aperture 24 is an expansion slot 26 extending outwardly from each corner. In addition, a slight lubricating groove 28 is cut into each of the inner side walls of the square aperture for conducting a lubricating fluid into and around the short arm 30 of the mud flap hanger 32. Connected to the short arm 30 is a long arm 34 inner connected to the short arm 30 by means of a curved neck member 36. The neck member 36 is curved downwardly and inwardly towards the rear wheels of a tractor or trailer. This curved neck portion permits the flaps to be moved approximately three to four inches closer to the wheel than if the long arm and short arm were within the same plane. A washer 38 is welded to the short arm at a point about where the neck member 36 changes into the short arm 30. A loose second washer 40 is positioned around the outer end of the short arm 30 resting against ledge 22 of the bushing 20. The washer is held securely in position by a pin 42 for placement within an aperture 44 bored through the lower end of the short arm 30. This pin retains the short arm securely within the bushing 20 contained within the housing member 16.

The mud flaps are fastened to the long arms by a plurality of clips 46 slidably positioned along the long arm 34 of the hanger member 32. The hanger members are constructed from solid square steel beams of approximately ¼ to 1/5 of the cross section of the housing member. The lower leg of the hanger member has ground down or filed corner edges to provide a generally square shaped outer surface of the lower arm. The corners are rounded to approximately 0.020 inch radius.

As shown in FIG. 5, the side wall of the housing member contains a lubricating nipple 48 for introducing a lubricating substance in between the outer ends of the bushing member for comminication with the short arm 30 of the hanger member. The lubricating material is carried along the side walls of the short arm by means of the lubricating grooves 28 and, in some instances, the expandable slots 26, depending upon the position of the short arm within the bushing.

As shown in FIG. 2 in phantom, the arms comprising the mud flap hanger means may be pivotally moved inwardly along the back side of the support member 14.

The use and operation of the mud flap hanger of this invention on truck tractors is simple. After the mud flaps have been attached to the long arm and after the housing member is fixed to the frame of a tractor or trailer, the mud flap hanger means may be pivotally moved as shown in FIG. 2 within the bushing 20 so that the mud flaps attached to the hanger means can be positioned directly behind the wheels of a tractor or trailer. If the operator of the vehicle desires to store the mud flaps in a position whereby they would be free and clear of potential damage while a trailer is attached to the tractor, the arms of the mud flap hanger means may be pivotally moved and the flaps stored centrally in between the rear wheels. To facilitate the pivotal movement of the lower arm a lubricating fluid may be periodically introduced into the system through nipple 48.

The bushing is generally constructed from a rubber like material or a polymeric material capable of flexing and expanding yet substantially rigid enough to prevent the arms from being inadvertently rotated durings its use. To provide maximum use of the bushing, the material selected should contain a tensile strength and density sufficient to minimize frictional wear and tear on the inner walls of the bushing during the pivotal movements of the mud flap hanger means. Materials which have been found to be particularly satisfactory include the following: polyurethanes, olefininic polymers, epoxies and the like. Preferably the bushing is constructed from a material such as a thermosetting polyurethane elastomer having a durometer Shore A value of between about 60 to 110. Preferably one of the bushings should have a durometer value of between 85-95. An equivalent effect can be realized by both the upper and lower bushings having the same durometer values but having bushings of different lengths.

It should be understood that the foregoing description and examples are for illustrative purposes and no limitations are thereby intended, the scope of the invention being limited solely by the appended claims.

I claim:
1. A mud flap hanger comprising:
   (a) a support member having opposite sides,
   (b) a housing member fixed to each side of said support member, said housing member having opposite ends and a vertically extending through aperture,
   (c) a flexible polymeric bushing inserted within each end of said housing members, said bushing having a substantially square shaped aperture, at least one expansion slot located near one of the corners of said square shaped aperture and at least one lubricating groove,
   (d) a mud flap hanger means having a substantially square shaped short arm connected to a long arm to which is mounted a mud flap, said short arm being snugly held within said square shaped aperture whereby said mud flap hanger means is capable of being pivoted within said bushing while at the same time is capable of being held stationary in either a working or a stored mode, and
   (e) means for substantially inhibiting axial movement of said short arm within said bushing.
2. The mud flap hanger of claim 1 wherein said flexible bushing includes a ledge for limiting the depth of said bushing within said housing member.
3. The mud flap hanger of claim 2 wherein said support member includes a bracket for mounting said mud flap hanger to a vehicle.
4. The mud flap hanger of claim 3 wherein said long arm includes means for connecting a mud flap thereto.
5. The mud flap hanger of claim 1 wherein said housing member includes a lubricating inlet for introducing a lubricant into said lubricating groove.
6. The mud flap hanger of claim 5 including a panel fixed to said support member and extending downward therefrom, said panel being having openings for receiving illuminating lamps.

7. The mud flap hanger of claim 5 wherein said short arm includes a washer fixed thereto for limiting the depth of said short arm into said bushings.

8. The mud flap hanger of claim 7 wherein said inhibiting means includes a locking pin for preventing said short arm from being withdrawn from said bushing.

9. The mud flap hanger of claim 7 wherein said washer is fixed to said short arm by spot welding for distributing stress characteristics.

10. The mud flap of claim 1 wherein said short arm includes slightly radiused outer corners to facilitate pivotal movement within said bushing.

11. The mud flap hanger of claim 1 wherein one of said bushings within said housing members is more rigid than the other.

12. The mud flap hanger of claim 1 wherein one of said bushings within said housing members is longer in length than the other.

* * * * *